United States Patent
Riddiford et al.

(10) Patent No.: US 7,018,001 B2
(45) Date of Patent: *Mar. 28, 2006

(54) FAST MODE RELEASE IN A FORCE GENERATING APPARATUS

(75) Inventors: Bryan P. Riddiford, Dayton, OH (US); Richard J. Thomas, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/081,122

(22) Filed: Feb. 22, 2002

(65) Prior Publication Data

US 2003/0160503 A1   Aug. 28, 2003

(51) Int. Cl.
*B60T 8/34* (2006.01)
(52) U.S. Cl. ................... 303/113.4; 303/115.2
(58) Field of Classification Search ............. 303/113.1, 303/113.2, 113.4, 113.5, 115.2, 157, 162
See application file for complete search history.

(56) References Cited

U.S. PATENT DOCUMENTS

| | | | |
|---|---|---|---|
| 5,071,199 A * | 12/1991 | Spadafora et al. | 303/162 |
| 5,106,171 A * | 4/1992 | Leppek et al. | 303/162 |
| 5,496,102 A * | 3/1996 | Dimatteo et al. | 303/162 |
| 6,371,574 B1 * | 4/2002 | Hageman et al. | 303/115.2 |
| 6,655,756 B1 * | 12/2003 | Riddiford et al. | 303/162 |

OTHER PUBLICATIONS

U.S. Appl. No. 10/004,240, filed Nov. 2, 2001, Riddiford et al.
U.S. Appl. No. 10/039,494, filed Oct. 26, 2001, Riddiford et al.

* cited by examiner

*Primary Examiner*—Thomas Williams
(74) *Attorney, Agent, or Firm*—Michael D. Smith

(57) ABSTRACT

The problem of maintaining fluid modulus during a fast mode release of fluid pressure in a force generating apparatus having a force generating actuator fluidically coupled to a force generating device is solved by limiting the rate at which the actuator can reduce fluid pressure in an apply chamber of the actuator to a rate low enough to preclude a change in modulus of the fluid during the fast mode release.

20 Claims, 8 Drawing Sheets

FAST MODE RELEASE IN A FORCE GENERATING APPARATUS

TECHNICAL FIELD OF THE INVENTION

This invention relates to an improvement in force generating actuator control design and specifically improves control of force generation in a force generating apparatus having a fluid link between an actuator and a force generating device.

BACKGROUND OF THE INVENTION

For more than three quarters of a century, braking and actuation of clutches or other on-board power train devices in both on and off-road vehicles have typically been provided by hydraulic systems. In a hydraulic braking system, a brake actuation cylinder at each corner of the vehicle includes a piston that moves, in response to application of hydraulic pressure, to force a brake pad against a brake rotor or drum attached to one of the wheels of the vehicle, to slow or stop the wheel from turning. The brake cylinders at the wheels are connected via fluid conduits, known as brake lines, to a remotely located actuator, such as a master cylinder. The master cylinder includes a master cylinder piston that is moved in a pressure chamber of the master cylinder, when an operator steps on a brake pedal or moves a brake lever connected to the master cylinder, to generate hydraulic pressure for transmission through the brake lines to the brake cylinders.

Such a hydraulic braking system will also typically include a reservoir at the master cylinder, for supplying or receiving brake fluid from the brake lines as the pistons move in the master cylinder and wheel cylinders. Such systems also frequently include a booster, driven by engine vacuum, for augmenting the force applied by the operator to provide "power brakes."

In recent years, hydraulic braking systems have also included sensors at the wheels to detect when the wheels are slipping, and devices for pulsing or reducing brake force under certain operating conditions to improve control of the vehicle. These systems are sometimes known as Antilock Brake Systems (ABS) or Traction Control Systems (TCS).

Many of the features and elements described above in relation to a vehicle braking system are also used for actuating hydraulic clutches, or shifting systems for transmissions, transfer cases, or other power train components in vehicles.

In all of the systems describe above, a central pressure producing device, such as a master cylinder, is used for producing hydraulic pressure that is transmitted via fluid conduits to the wheel cylinders, clutch, etc., in response to an operator directly actuating a piston in the pressure producing device by stepping on a pedal, or moving a lever.

There is a need and desire in some modern vehicles, however, to replace some of the components of a traditional hydraulic braking or actuation system with electrically operated components. Such a change is desirable, in some cases, to reduce cost or weight of the components themselves, and to improve space utilization in the vehicle, by allowing the master cylinder to be located remotely from the passenger compartment and actuated electrically, rather than being limited to arrangements in which the master cylinder is mechanically connected directly to a brake pedal or lever. Electrically operated components also offer the potential for improved control of the braking system, when coupled with an on-board computer capable of receiving inputs from on-board sensors and adjusting brake pressure applied at each wheel as a function of vehicle operating conditions. In general, brake systems using electrically actuated components are known as "brake-by-wire"(BBW) systems.

There is a need and a desire in some modern vehicles, to develop a force application system that does not rely on a central source of hydraulic pressure. In one form of such a non-centralized braking system, each wheel is equipped with a braking unit that includes an independent actuator for producing hydraulic pressure in a chamber of the actuator. The chamber pressure is connected via a brake line to a brake cylinder at the wheel. The brake cylinder operates in essentially the same fashion as the traditional hydraulic braking systems described above having a central source of hydraulic pressure for multiple wheels. The actuator at each wheel includes an electrical device, such as an electric motor, that is used to drive a piston in a bore of the actuator for generating pressure in the actuator chamber. The amount of braking force applied by the brake at each wheel is regulated by sending an electrical force actuation signal to the motor of the brake actuator. Such a system is commonly called a hybrid brake-by-wire (BBW) system, because, although the actual braking force applied to the wheel is still generated by hydraulic pressure acting on the piston of the wheel cylinder, the amount of pressure generated is regulated by electrical signals traveling to the braking units by wires rather than by fluid pressure traveling through brake lines or fluid conduits, as was the case in traditional hydraulic braking systems.

Regardless of whether the BBW system is a hybrid or not, it is generally desirable in BBW systems for the operator to perceive that the BBW system responds in very much the same manner, or in a superior manner, to a traditional hydraulic braking system. Achieving such performance presents significant challenges to designers of BBW systems, however, because the dynamic performance of a system including electrical components is fundamentally different from a traditional system having all hydraulic components, and a mechanical linkage between the driver and a central source of hydraulic pressure. Hydraulic systems have many linear and non-linear operating characteristics related to fluid volume, damping, pressure drops in the hydraulic circuit, and delayed operation of the components that are not found inherently in a BBW system. Electrically operated actuators can, in many instances respond to a signal input much more rapidly than hydraulic components, creating both design problems to be dealt with and opportunities to control performance that cannot be achieved in hydraulic systems.

In order to achieve a desired level of performance in a BBW system, commonly assigned United States patent application bearing the Common Assignee's docket number DP-305470, titled Gain Scheduling For Controlled Force Application and incorporated herein by reference, discloses a method and apparatus for determining and supplying an electrical force signal to an electrically operated actuator in response to a parameter of a desired force signal received from a brake pedal or other input signaling device. A controller receives the desired force signal, determines a parameter of the desired force signal, selects a set of gains based on the parameter, applies the set of gains to a linear control function, determines the electrical force control signal and sends the electrical force signal to the actuator. In this manner, a desired control performance is obtained through use of predetermined gain schedules and linear control functions in a manner that can be handled more effectively and efficiently by the controller than would be the case if the controller were simply programmed to incorporate a complex control function simulating both linear and non-linear characteristics of a typical hydraulic actuation system. Modern controllers are capable of handling a large number of gain schedules and linear control functions, thereby allowing even non-linear portions of a control spectrum to be simulated by a piece-wise simulation with linear equations.

Although the Gain Scheduling approach works well for controlling basic operation of a BBW system, there are special conditions such as an abrupt application and reapplication of the brake by the operator that must also be dealt with. Commonly assigned United States patent application bearing the Common Assignee's docket number DP-305469, titled Control Command Modification To Minimize Saturation Effects for Controlled Force Application and incorporated herein by reference, discloses including preset tables of gains related to a particular mode of operation, such as fast, normal or slow apply or release. Selection of a particular set of gains is made on the basis of inputs indicating that the force application system is operating in a particular mode of operation, as indicated by the difference between the current actuator pressure and the desired actuator pressure. In order to compensate for time lags inherent in a brake module, and to prevent conflicting signals from being sent to an actuator within the response time of a previously sent signal, a timing function is utilized. This timing function precludes saturation of the operational spectrum of the brake controller or overshooting the desired force output of the actuator as a result of operator actions, such as a rapid brake pedal position change during an apply mode.

Although the BBW systems described above work well for many types of controlled force actuation, in hybrid BBW systems having modules with high-speed actuators, such as motor driven ball screw piston devices for pressurizing hydraulic brake fluid to ultimately apply the brake, the problem of non-linearity of the system is exacerbated by the volatility of the hydraulic brake fluid. Under operating conditions known as fast mode release (FMR), where the piston is rapidly retracted by the actuator, resistance of the fluid to flow through the brake components and actuator is great enough to prevent the fluid from being pulled back from the force applying element as rapidly as the actuator can move the piston. As a result, the pressure of the hydraulic fluid drops so low within the actuator, for a short period of time during FMR, that volatile constituents of the hydraulic fluid may boil off, and form microscopic sized bubbles in the fluid that greatly reduce the modulus of the fluid.

In normal braking operations when the entrained microscopic bubbles are not present, the hydraulic fluid behaves in a predictable manner as a substantially incompressible fluid, such that any re-application of force by the actuator piston will be immediately transmitted to the force applying element. In contrast, fluid containing entrained microscopic bubbles behaves as a compressible fluid until the pressure in the actuator is increased to a point where the microscopic bubbles of volatile constituents are reabsorbed into the fluid. This can require very high pressures on the order of 100,000 pounds per square inch to cause re-absorption of the microscopic bubbles within a short enough time span to allow acceptable performance of the brake on reapplication of pressure by the actuator. Generating such pressures is typically beyond the desirable operational capability of the actuator device. At lower pressures, the time for re-absorption is too long for acceptable operation of the force generating apparatus.

During operation of a brake system for a vehicle under FMR conditions, microscopic bubbles in the fluid can even result in the actuator piston being damaged by striking the end of the cylinder, if the operator re-applies the brake too soon after releasing the brake. The time to reabsorb the microscopic bubbles can be far too long to allow safe operation of the vehicle, because the operator will not be able to re-apply the brake until the microscopic bubbles have been re-absorbed into the hydraulic brake fluid.

The present invention is aimed at resolving one or more of the problems identified above.

SUMMARY OF THE INVENTION

Our invention provides improved control of a force generating apparatus having a force generating actuator fluidically coupled to a force generating device, by determining when the force applying element is in a fast mode release and controlling the actuator to limit the rate at which the actuator can reduce fluid pressure in an apply chamber of the actuator to a predetermined rate low enough to preclude a change in modulus of the fluid during fast mode release.

Limiting the rate of reduction of fluid pressure in the actuator apply chamber in this manner, causes the actuator to move more slowly than it otherwise would, and to thereby lag the desired force by an amount sufficient to preclude loss of fluid modulus that would hinder rapid re-application of the force applying element.

In one form of our invention, a force generating apparatus for providing a force to a moving element based upon receipt of an electrical force signal includes a force applying element, an actuator and a controller. The force applying element defines a hydraulic cylinder, and includes a force applying piston within the cylinder coupled to the moving element for applying the force to the moving element in response to increasing or decreasing fluid pressure within the cylinder. The actuator defines an apply chamber and further includes an actuator piston within the apply chamber coupled to an actuator piston drive element for selectively increasing and decreasing a fluid pressure in the apply chamber. The apply chamber is fluidically coupled to the cylinder and force applying piston of the force applying element, for actuation of the piston by selectively increasing and decreasing fluid pressure in the apply chamber and cylinder in response to receiving the electrical force signal. The controller determines when the force applying element is in a fast mode release, and modifies the value of the electrical force signal sent to the actuator to limit the rate at which fluid pressure in the apply chamber is reduced during the fast mode release.

The force generating apparatus may take many forms, including a brake caliper and a rotor, a brake shoe and drum, a clutch pack, or other actuation devices in vehicle drivetrains.

The force generating apparatus may include an actuator piston drive element of the actuator having a motor responsive to the electrical force signal and a gear-ball screw assembly coupled to the motor.

The force generating apparatus may also include a solenoid between the apply chamber and the force applying element for selectively isolating and connecting the force applying element from the fluid pressure in the apply chamber. The force generating apparatus may further include a transducer coupled to the chamber of the actuator for sensing the chamber pressure and further coupled to the controller for delivering a chamber pressure signal to the controller.

The controller may be adapted for receiving a desired force signal and configured to determine operation in fast mode release by: determining the desired pressure from the desired force signal; determining a chamber pressure in the actuator chamber; calculating a chamber pressure error by subtracting the desired pressure from the chamber pressure; and comparing the chamber pressure error to a first predetermined value of FMR DELTA PRESSURE indicating fast mode release operation. The controller may be further configured for determining exit from fast mode release by comparing the chamber pressure error to a second predetermined value of FMR DELTA PRESSURE indicating normal release mode operation, and ceasing modification of the electrical force signal when the force generating apparatus is no longer operating in fast mode release.

Our invention may also take the form of a method for operating a force generating apparatus as described above.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

DETAILED DESCRIPTION OF THE PRESENTLY PREFERRED EMBODIMENTS

Figure 1:
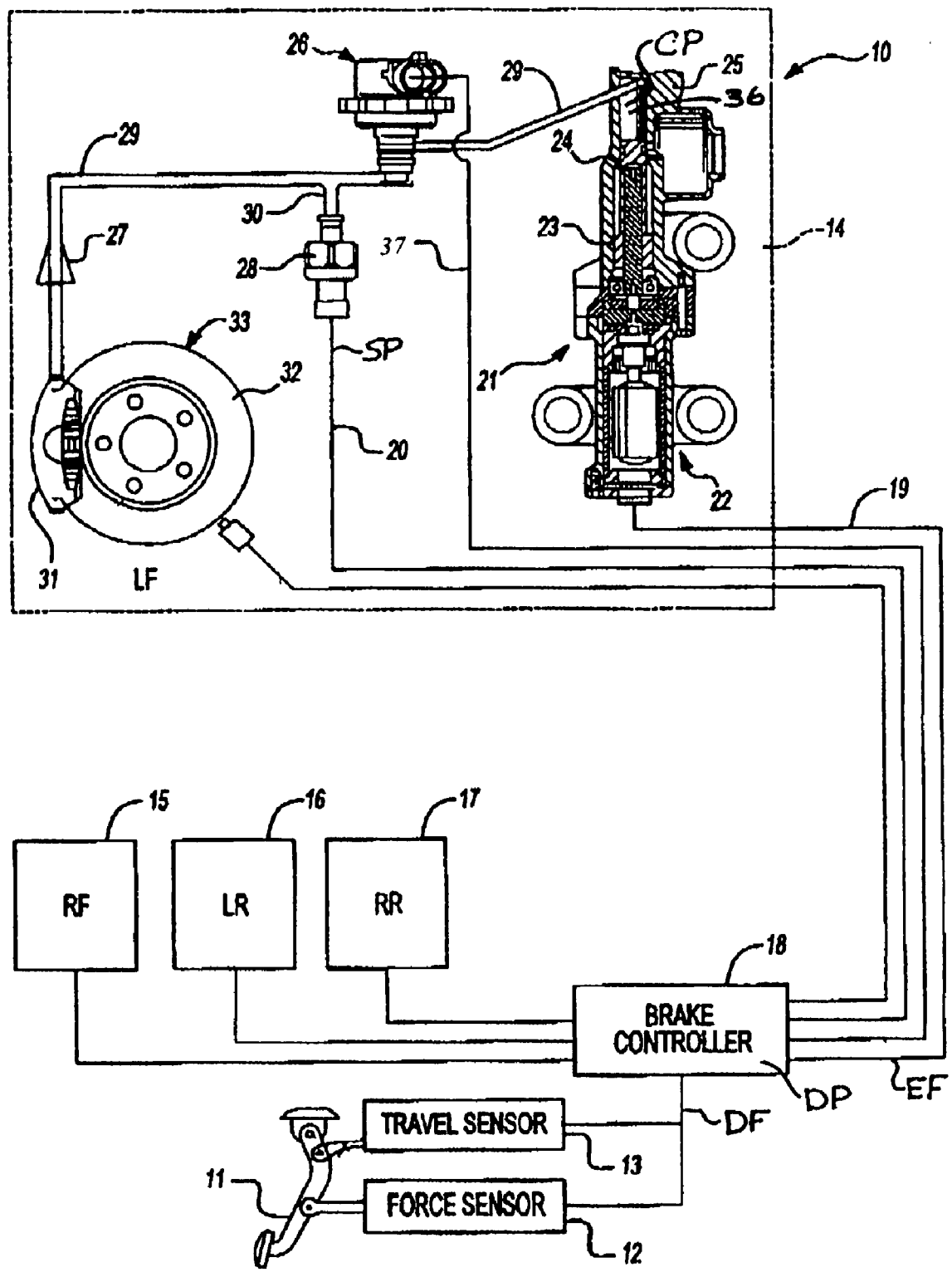
FIG. 1 is a schematic illustration of an exemplary embodiment of a force generating system in the form of a braking system having hybrid, self-contained, electro-hydraulic modules at each wheel and a controller, according to our invention.

FIG. 1 schematically illustrates an exemplary embodiment of a force generating apparatus 10, according to our invention, in the form of a hybrid brake-by-wire braking system incorporating electro-hydraulic modules and a controller of the present invention. Force exerted on the brake pedal 11 is applied to a force sensor 12 and a travel sensor 13, that in turn generate a desired force electrical signal DF to a controller 18. The controller 18 processes the desired force signal DF to determine a desired pressure DP, and generates a corresponding electrical force signal EF to a left front corner brake module 14 of a vehicle. While FIG. 1 only shows the left front corner brake module 14, it will be appreciated that appropriate electrical force signals EF are transmitted by the controller 18 to all four corners of the vehicle, or each of the individual braking systems of the vehicle as the case may be.

The left front corner brake module 14 of FIG. 1 will now be described in detail. Corners 15, 16, and 17 are identical.

The force sensor 12 and/or the travel sensor 13 transmit the desired force signal DF to an electronic control module 18, which via actuator signal line 19, is electrically connected to an actuator assembly 21, and specifically to a motor 22 of the actuator 21. The motor 22 drives a gear mechanism and ball screw assembly 23 that applies and releases a hydraulic piston 24 within a pressure apply chamber 36 of an actuator body 25 to generate a chamber pressure CP in the apply chamber 36.

A fluid line 29 extends from the actuator body 25. A pressure transducer (or pressure sensor) 28 is connected via a fluid port 30 in the fluid line 29 to the actuator 21 for sensing pressure in the fluid line 29.

Figure 2:
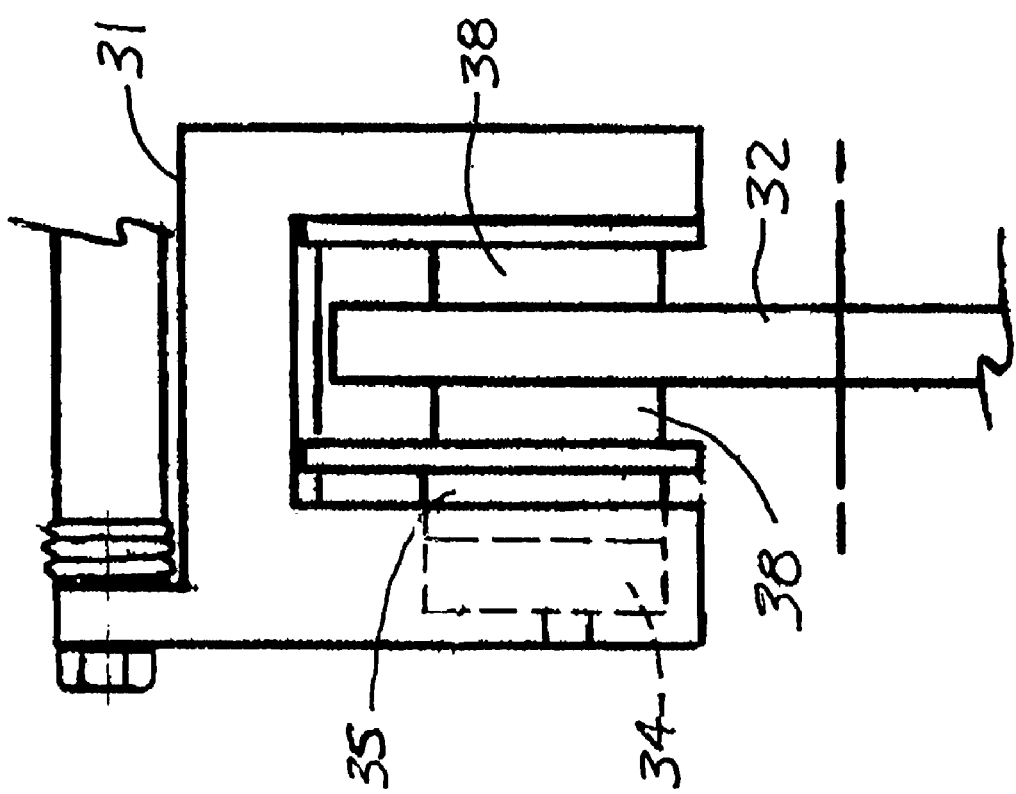
FIG. 2 is a schematic illustration of a brake caliper of the embodiment depicted in FIG. 1.

As shown in FIGS. 1 and 2, the disk brake 33 includes a brake caliper 31, having a cylinder 34, and a force applying piston 35 disposed in the cylinder 34. The force applying piston 35 operates to clamp brake pads 38 against the rotor 32, as the brake is applied and released, to control rotation of the wheel.

A solenoid valve 26 is located in fluid line 29 downstream of piston 24 and upstream of pressure transducer 28. The solenoid valve 26 is normally open, and is used for conserving energy during periods of prolonged braking, as described in greater detail below.

The pressure transducer 28 supplies a sensed pressure signal SP to the controller 18 via transducer signal line 20, indicative of pressure delivered to the cylinder 34 of the piston 35 of the brake caliper 31. Where the fluid line 29 is short, and rigid, and there are negligible flow restrictions in the line 29, the solenoid valve 26 and the actuator 21, the pressure measured anywhere in the line 29, or at the actuator 21 will be approximately equal to the pressure applied in the caliper cylinder 34. Where the line 29 and actuator 21 do have significant flow restrictions, the sensed pressure SP will still be indicative of the pressure in the caliper cylinder 34, but will not necessarily match the pressure in the caliper cylinder 34, or the chamber pressure CP in the actuator apply chamber 36 of the actuator 21.

During a fast mode release, the chamber pressure CP is potentially the point of lowest pressure in the system, and may cause the fluid modulus to drop unacceptably low if the chamber pressure CP drops too low. Our invention utilizes the value of sensed pressure SP as an indicator of chamber pressure CP. Where the configuration of the components is such that the sensed pressure SP is approximately equal to the chamber pressure CP during a fast mode release, the location of the pressure sensor 28 is not particularly critical. We contemplate, however, that in some embodiments of our invention it may be advantageous to have additional pressure transducers or sensors including, for example, a pressure transducer positioned for directly measuring chamber pressure CP in the apply chamber 36 of the actuator, or to reposition the pressure transducer 28 for directly measuring chamber pressure CP.

During a normal brake apply and release, fluid displaced from or drawn back into the apply chamber 36 flows through the fluid line 29 to and from an outlet 27 of the fluid line 29. Fluid pressure generated in the apply chamber 36 is transmitted through the fluid line 29 and outlet 27 to a force applying element, here shown as a disk brake 33 having a rotor 32 adapted for attachment to the left front wheel of the vehicle.

As shown in FIGS. 1 and 2, the disk brake 33 includes a brake caliper 31, having a cylinder 34, and a force applying piston 35 disposed in the cylinder 34. The force applying piston 35 operates to clamp brake pads 38 against the rotor 32, as the brake is applied and released, to control rotation of the wheel.

A solenoid valve 26 is located in fluid line 29 downstream of piston 24 and upstream of pressure transducer 28. The solenoid valve 26 is normally open, and is used for conserving energy during periods of prolonged braking, as described in greater detail below.

During normal braking operations, when the operator applies the brake 33 by pressing on the brake pedal 11, the travel sensor 11 and the force sensor 12 send the desired force signal DF to the controller 18. The controller 18 generates the electrical force signal EF to actuate the motor 22 for driving the ball screw assembly 23 and hydraulic piston 24 to pressurize fluid in the apply chamber 36 and generate the chamber pressure CP. The fluid line 29 transmits the chamber pressure CP to the force applying element 33. The controller 18 also receives the sensed pressure signal SP from the pressure transducer 28, thereby allowing the controller 18 to monitor fluid pressure within fluid line 29, as an indication of chamber pressure CP in the apply chamber 36 of the actuator assembly 21. Braking of the wheel brake 33 is accomplished by the piston 24 of the actuator 21 displacing fluid through the fluid line 29, to thereby increase pressure in the apply chamber 36 and the cylinder 34 and cause the force applying piston 35 to move the brake pads 38 into contact with the rotor 32 for slowing and/or stopping the rotor 32.

When the brake controller 18 senses a prolonged application of the brake pedal 11, such as might be encountered when waiting at a stoplight, a close signal is transmitted to the solenoid 26 via a solenoid signal line 37. The solenoid 26 closes and maintains the caliper 31 and the fluid line 29 downstream of the solenoid 26 in a pressurized state, thereby allowing the load on the actuator 21 to be removed until the controller 18 commands a new braking signal. In embodiments of our invention that do not include the solenoid 26, electrical power must be continuously applied to the motor 22 to maintain a desired pressure in fluid line 29.

Figure 3:
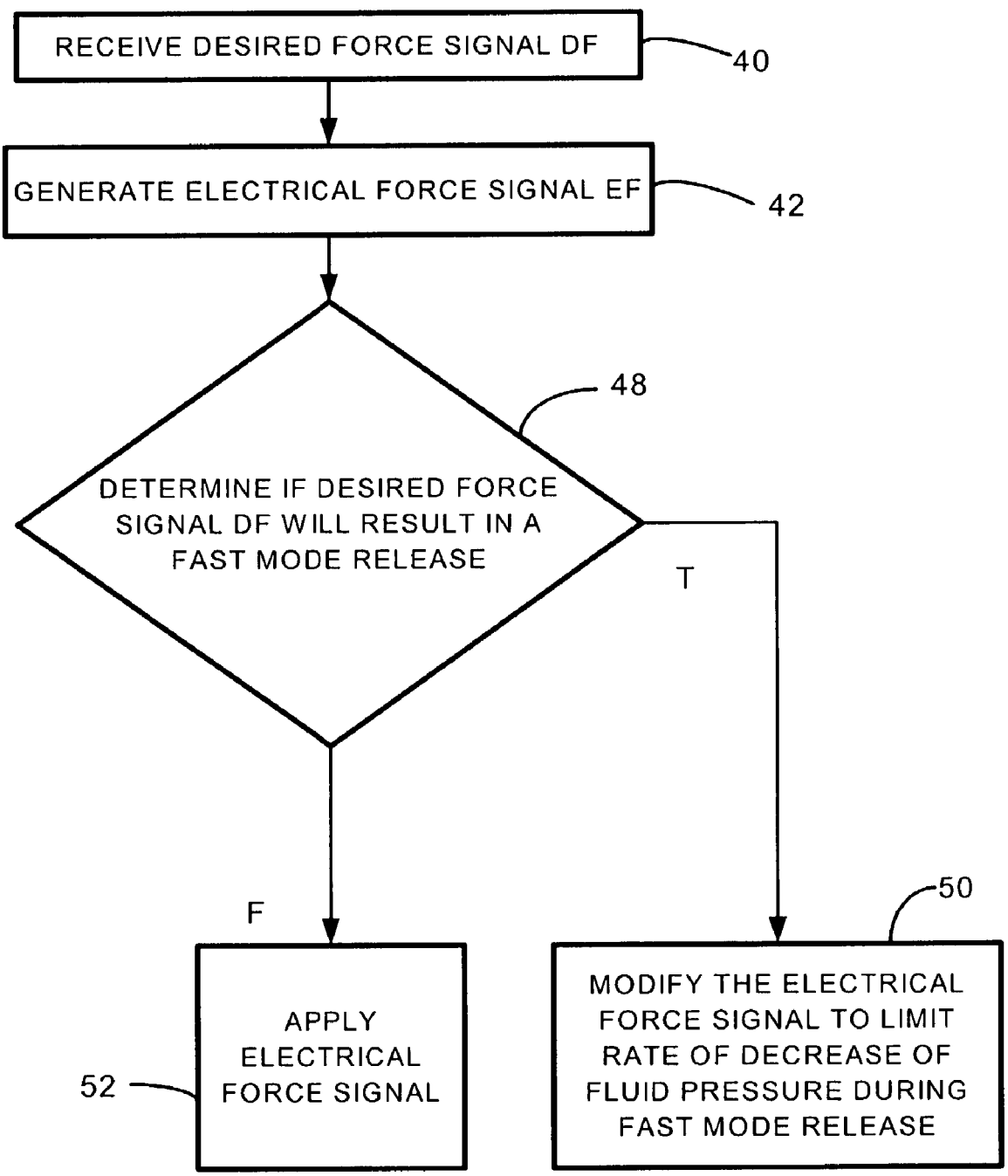
FIG. 3 is a flow chart for a method including a process for determining if a force generating apparatus is operating in a fast mode release, according to our invention.

When the operator releases, or reduces pressure on the brake pedal 11, the brake controller 18 generates a signal to reverse the motor 22 and ball screw assembly 23, thereby reducing chamber pressure CP, and relieving fluid pressure in the fluid line 29 for releasing the wheel brake 33. Specifically, as shown in FIGS. 1–3, when pressure is reduced or removed from the brake pedal 11, the controller 18 receives 40 the desired force actuation signal DF from the travel sensor 13 and force sensor 12. In response to the desired force signal DF indicating that the brake force is to be reduced, the controller 18 generates 42 and prepares to send an electrical force signal EF to the motor 22 that will cause the motor 22 to drive the ball screw 23 in a direction that will retract the piston 24 in the chamber 36 of the actuator 21, and reduce thereby chamber pressure CP in the chamber 36, which in turn would reduce the pressure in the line 29, and the cylinder 34 of the caliper 31. The electrical force signal EF may be generated by the controller according to appropriate linear or non-linear control functions or schedules stored in the controller 18.

As shown in FIG. 3, prior to sending the electrical force signal EF to the motor 22, the controller 18 determines 48 if the electrical force signal EF generated in response to the desired force signal DF will result in a fast mode release. If the controller 18 determines that the generated EF signal will not result in a fast mode release, the electrical force signal EF is applied 52 to the motor 22 without modification. If the controller 18 determines 48, however, that the electrical force signal EF would result in a fast mode release, the controller 18 modifies 50 the electrical force signal EF prior to sending the signal EF to the motor 22, in a manner that will limit the speed at which the motor 22 retracts the piston 24 to thereby limit the rate at which chamber pressure CP is reduced in the apply chamber 36 during fast mode release. The electrical force signal EF is modified by the controller 18 during fast mode release operation according to an appropriate linear or non-linear function, or by application of one or more constants stored in the controller 18.

Figure 4:
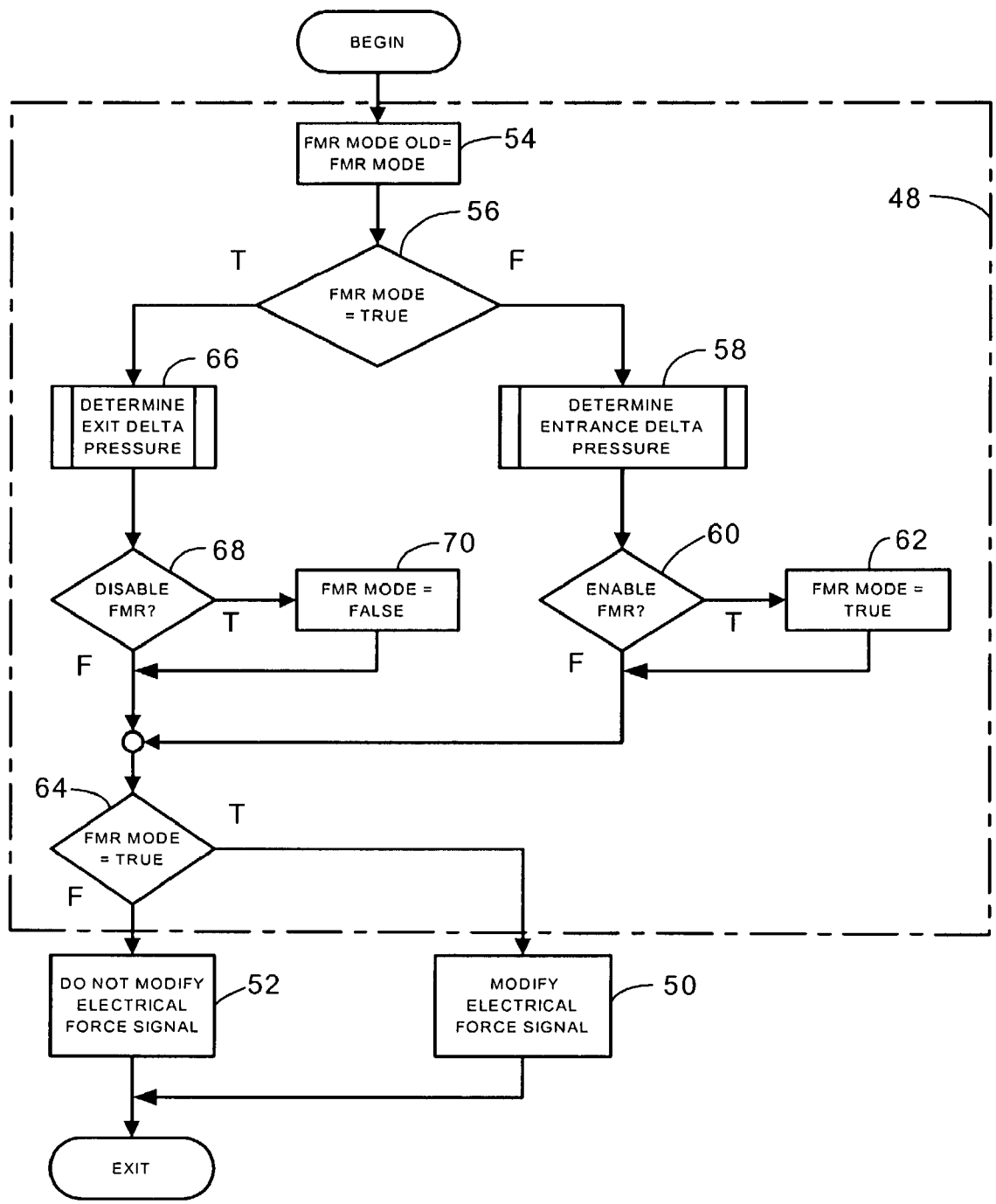
FIGS. 4–8 are flow charts depicting subroutines, according to our invention, that are part of the process depicted in FIG. 3 for determining if a force generating apparatus is operating in a fast mode release.

FIGS. 4–8 depict an exemplary method for determining 48 if the desired force signal DF will result in a fast mode release. The process illustrated in FIG. 4 is an FMR determining subroutine 48 contemplated to operate as part of a closed loop brake control method. The FMR subroutine 48 of FIG. 4 is repeated continually at a fixed repetition rate of about once every millisecond.

At the beginning of each iteration of the FMR determining subroutine 48, the initial FMR MODE is set to the FMR MODE from the previous iteration of the subroutine 48, as shown at block 54. The subroutine 48 will then check to see if the force generating apparatus 10 is already operating in a fast mode release, as shown at diamond 56.

If the force generating apparatus 10 is not already operating in an FMR mode, the subroutine 48 invokes another subroutine 58 for determining an FMR ENTRANCE DELTA PRESSURE, as described in more detail below with regard to FIG. 5. The FMR ENTRANCE DELTA PRESSURE is in turn used by another subroutine 60 for determining if the controller 18 should enable FMR operation and modify the electrical force signal EF, as described in more detail below with regard to FIG. 7. If the subroutine 60 determines that FMR operation should be enabled, FMR MODE is set to TRUE, as shown in block 62, and the FMR MODE=TRUE triggers a signal from diamond 64 commanding the controller 18 to modify 50 the electrical force signal EF to limit the speed at which the motor 22 will retract the piston 24 in the apply chamber 36 in a manner that will prevent the chamber pressure CP from dropping so low that the volatile components of the fluid could boil off and undesirably alter the modulus of the fluid. If the subroutine 60 determines that FMR operation should not be enabled, however, FMR MODE is set to FALSE, which in turn triggers a signal from diamond 64 commanding the controller 18 to not modify 52 the electrical force signal EF and apply the unmodified signal EF to the motor 22.

If the force generating apparatus 10 is found at diamond 56 to already be operating in an FMR mode, the subroutine 48 invokes a subroutine 66 for determining an EXIT FMR DELTA PRESSURE, as described in more detail below with regard to FIG. 6. The EXIT FMR DELTA PRESSURE is in turn used by another subroutine 68 for determining if the controller 18 should enable FMR operation and modify the electrical force signal EF, as described in more detail below with regard to FIG. 8. If the subroutine 68 determines that FMR operation should be exited, FMR MODE is set to FALSE, thereby triggering a signal from diamond 64 commanding the controller 18 to not modify 52 the electrical force signal EF and to apply the unmodified signal EF to the motor 22. If, however, the subroutine 68 determines that FMR operation should not be exited, FMR MODE is set to TRUE, as shown in block 70, thereby triggering a signal from diamond 64 commanding the controller 18 to modify 50 the electrical force signal EF to limit the speed at which the motor 22 will retract the piston 24 in the apply chamber 36 to prevent the chamber pressure CP from dropping so low that the volatile components of the fluid would boil off and undesirably alter the modulus of the fluid.

Figure 5:
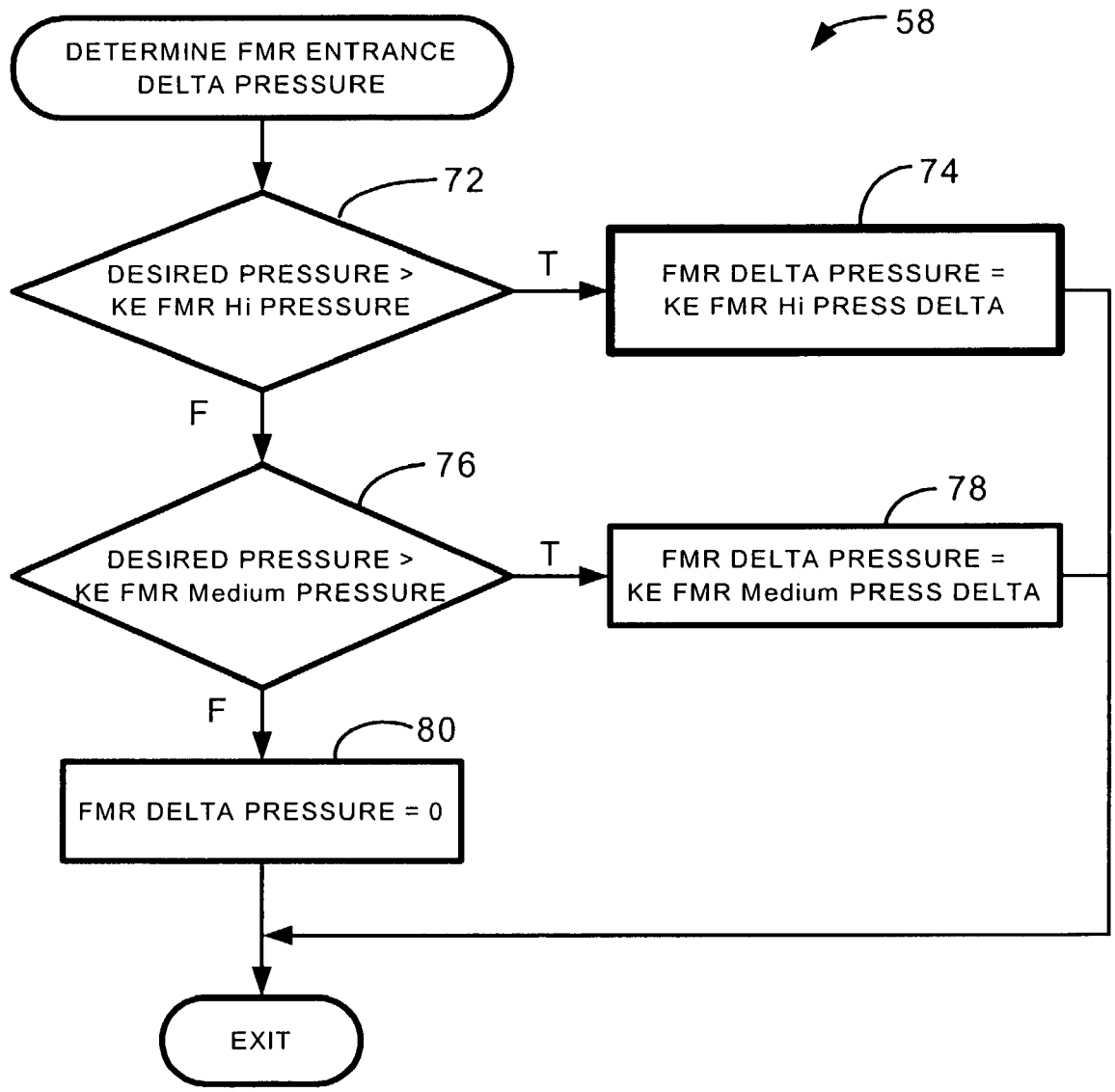

As shown in FIG. 5, an exemplary embodiment of the subroutine 58 determines a value of FMR ENTRANCE PRESSURE DELTA, by selecting a value of FMR DELTA PRESSURE from a schedule of FMR DELTA VALUES as a function of the desired pressure DP. The controller 18 determines a value of desired pressure DP from the desired force signal DF received from the brake pedal 11. If the desired pressure DP is higher than a constant known as KE FMR Hi PRESSURE, as shown in diamond 72, the FMR DELTA PRESSURE is set equal to a constant known as KE FMR Hi PRESS DELTA, as shown in block 74 of FIG. 5. If the desired pressure DP is not higher than the KE FMR Hi PRESSURE, the desired pressure DP is compared to a constant known as KE FMR Medium PRESSURE, as shown in diamond 76. If the desired pressure DP is higher than the KE FMR Medium PRESSURE, the FMR DELTA PRESSURE is set equal to a constant known as KE FMR Medium PRESS DELTA, as shown in block 78. If the desired pressure DP is not greater than either the KE FMR Hi PRESSURE or the KE FMR Medium PRESSURE values in the schedule, FMR DELTA PRESSURE is set equal to zero, as shown in block 80.

Figure 7:
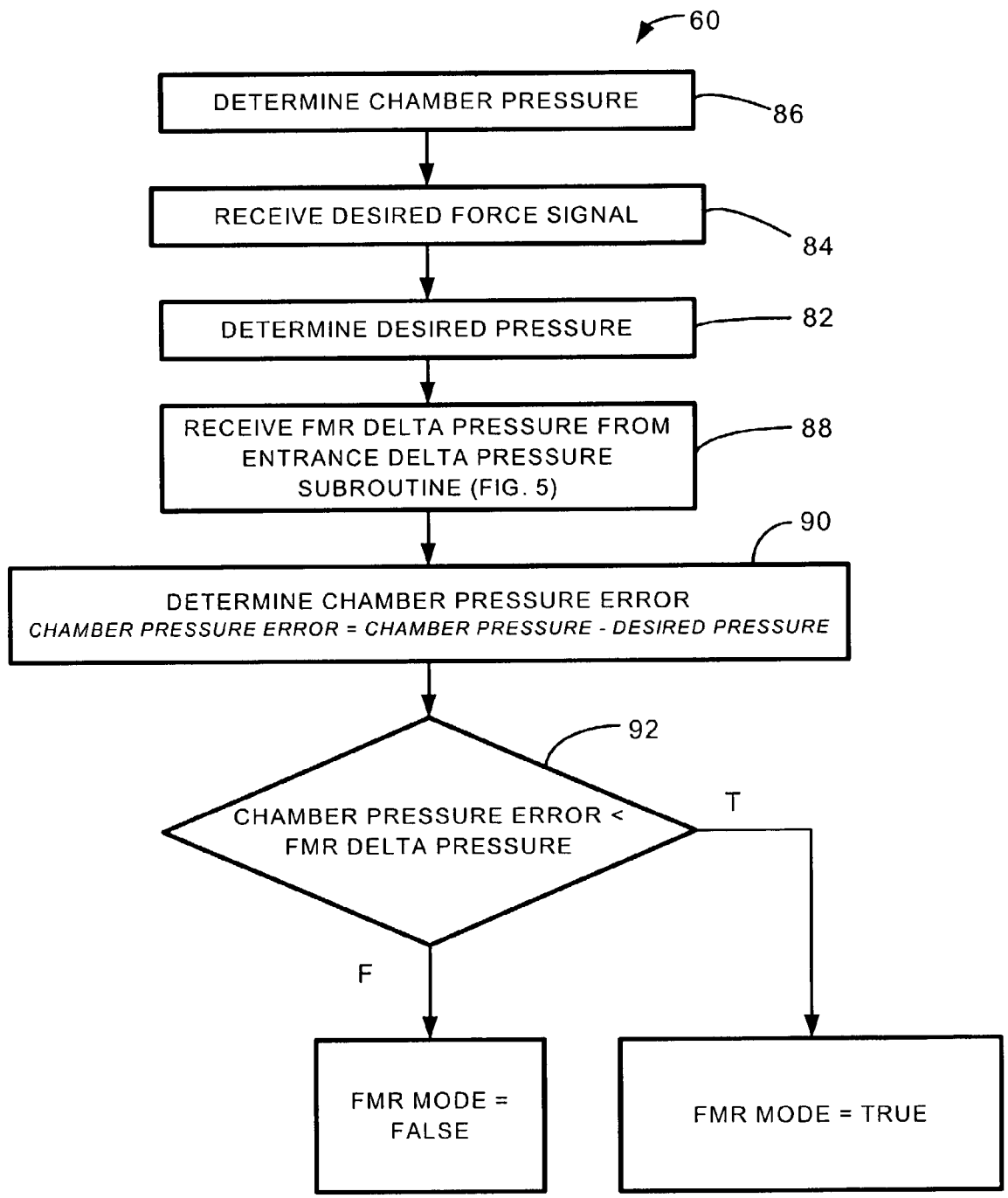

As shown in FIG. 7, the values of desired pressure DP and FMR DELTA PRESSURE from the subroutine 58 depicted in FIG. 5 are utilized in conjunction with the chamber pressure by the subroutine 60 to determine whether the desired force signal DF received by the controller 18 will result in a fast mode release, requiring that the electrical force signal EF be modified to limit the retraction rate of the motor 22 and piston 24 in the actuator 21. The desired pressure DP may be received from the subroutine 58, or determined from the desired force signal DF indicating the desired pressure DP, as shown in blocks 84 and 82 of the subroutine 60. The chamber pressure CP is determined by the controller 18 from the sensed pressure signal SP received from the pressure transducer 28, as shown at block 86 of the subroutine 60. The value of FMR DELTA PRESSURE used in subroutine 60 is received from the entrance delta pressure subroutine 58, depicted in FIG. 5, as shown at block 88. The subroutine 60 determines a value for CHAMBER PRESSURE ERROR by subtracting the desired pressure DP from the chamber pressure CP, as shown in block 90.

If the CHAMBER PRESSURE ERROR is less than the FMR ENTRANCE DELTA PRESSURE determined in subroutine 58, as shown in diamond 92 of subroutine 60, the FMR mode is set to TRUE, and the controller 18 is enabled to modify the electrical force signal EF, as shown in block 50 of FIGS. 3 and 4. If the CHAMBER PRESSURE ERROR is not less than the FMR ENTRANCE DELTA PRESSURE determined in subroutine 58, as shown in diamond 92 of subroutine 60, the FMR mode is set to false, and the controller 18 applies the unmodified electrical force signal EF to the motor 22, as shown in block 52 of FIGS. 3 and 4.

Figure 6:
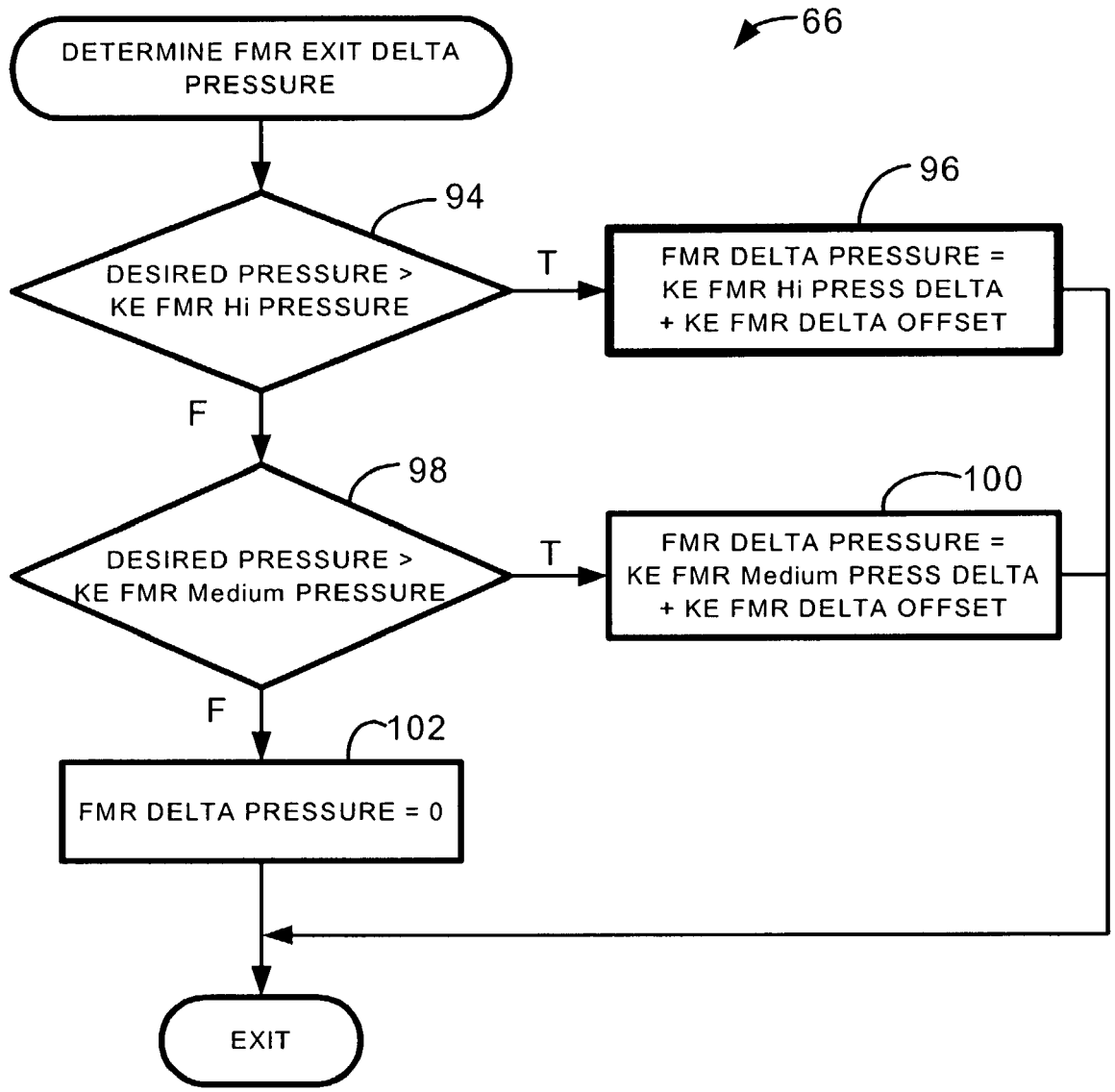
Figure 8:
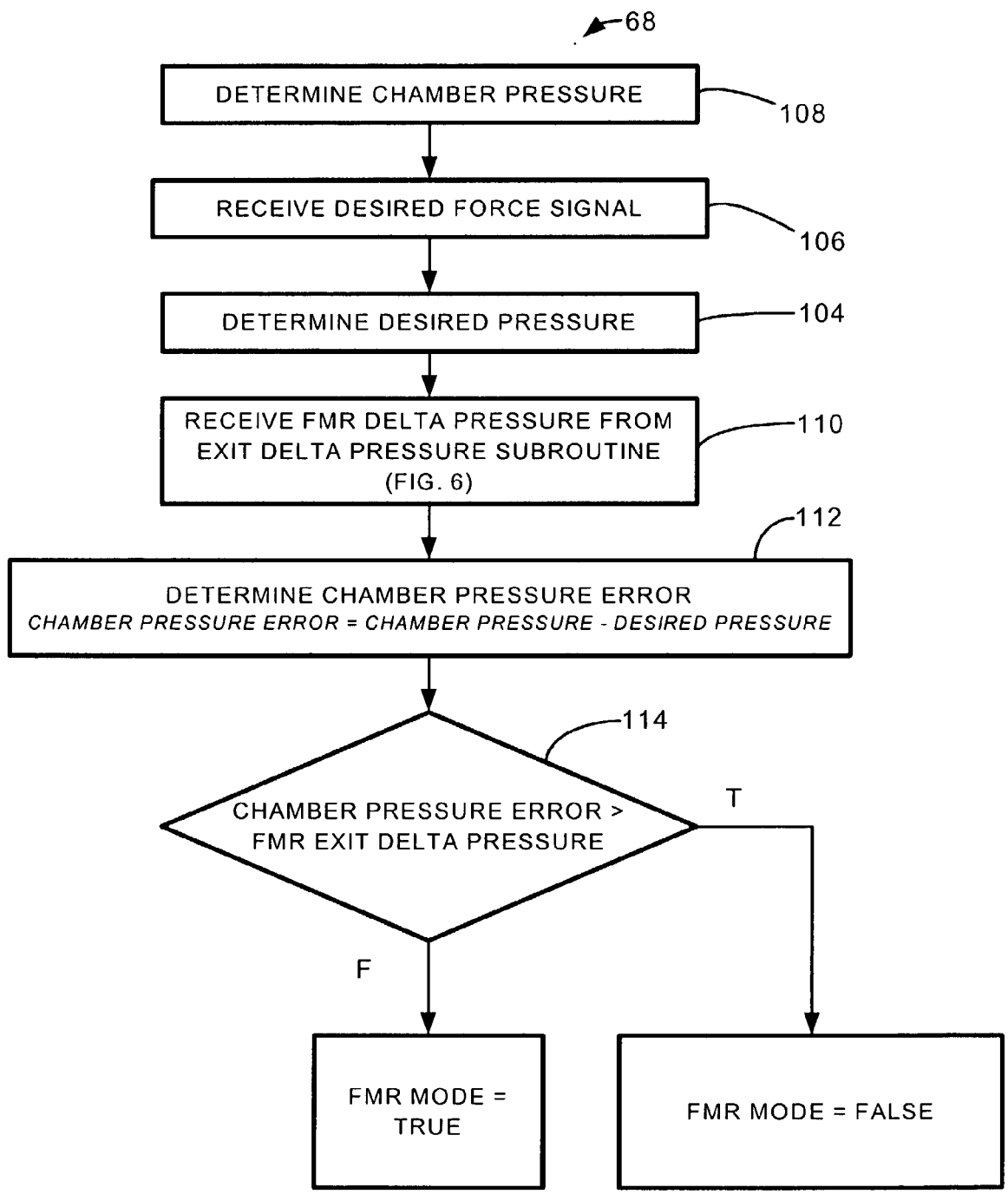

Operation of subroutines 66 and 68 for determining the EXIT DELTA PRESSURE and whether FMR should be disabled, as shown in FIGS. 6 and 8 respectively is very similar to the operation of subroutines 58 and 60 as described above.

As shown in FIG. 6, the subroutine 66 determines a value of FMR EXIT PRESSURE DELTA, by selecting a value of FMR DELTA PRESSURE from a schedule of FMR DELTA VALUES as a function of the desired pressure DP. If the desired pressure is higher than KE FMR Hi PRESSURE, as shown in diamond 94, the FMR DELTA PRESSURE is set equal the sum of the KE FMR Hi PRESS DELTA and a constant known as KE FMR DELTA OFFSET, as shown in block 96 of FIG. 5. If the desired pressure DP is not higher than the KE FMR Hi PRESSURE, the desired pressure DP is compared to the KE FMR Medium PRESSURE, as shown in diamond 98. If the desired pressure DP is higher than the KE FMR Medium PRESSURE, the FMR DELTA PRESSURE is set equal to the sum of the KE FMR Medium PRESS DELTA and the KE FMR DELTA OFFSET, as shown in block 100. If the desired pressure DP is not greater than either the KE FMR Hi PRESSURE or the KE FMR Medium PRESSURE values in the schedule, FMR DELTA PRESSURE is set equal to zero, as shown in block 102.

As shown in FIG. 8, the values of desired pressure DP and FMR DELTA PRESSURE from the subroutine 66 depicted in FIG. 6 are utilized by the subroutine 68, in conjunction with the chamber pressure CP, to determine whether the desired force signal DF received by the controller 18 will result in a fast mode release, requiring that the electrical force signal EF be modified to limit the retraction rate of the motor 22 and piston 24 in the actuator 21. The desired pressure DP may be received from the subroutine 66, or determined from the desired force signal DF indicating the desired pressure DP, as shown in blocks 106 and 104 of the subroutine 68. The chamber pressure CP is determined by the controller 18 from the sensed pressure signal SP received from the pressure transducer 28, as shown at block 108 of the subroutine 68. The value of FMR DELTA PRESSURE used in subroutine 68 is received from the entrance delta pressure subroutine 66, depicted in FIG. 6, as shown at block 110 of FIG. 8. The subroutine 68 determines a value for CHAMBER PRESSURE ERROR by subtracting the desired pressure DP from the chamber pressure CP, as shown in block 112.

If the CHAMBER PRESSURE ERROR is greater than the FMR EXIT DELTA PRESSURE determined in subroutine 66, as shown in diamond 114 of subroutine 68, FMR MODE is set to FALSE, and the controller 18 applies the unmodified electrical force signal EF to the motor 22, as shown in block 52 of FIGS. 3 and 4. If the CHAMBER PRESSURE ERROR is not less than the FMR EXIT DELTA PRESSURE determined in subroutine 66, as shown in diamond 114 of subroutine 68, the FMR mode is set to TRUE, and the controller 18 is enabled to modify the electrical force signal EF, as shown in block 50 of FIGS. 3 and 4.

The values of the constants used in subroutines 58, 60, 66, and 68 are selected on the basis of analysis and experimentation for a particular force generating apparatus 10, taking into account the volatility of the fluid used and dynamic factors of the apparatus design, such as the effective fluid orifice size resulting from the geometry of flow passages in components such as the solenoid 26 in the apparatus 10, and the proximity of the pressure transducer 28 to the apply chamber 36. For a force generating apparatus 10 as depicted in FIG. 1, where there is some distance between the pressure sensor 28 and the chamber 36, the values of the constants in the schedule are selected to allow the controller 18 to modify the electrical force signal EF signal during FMR operation in a manner that precludes the motor 22 from retracting the piston 24 so quickly that the fluid in the chamber 36 drops to such a low value that entrained microscopic bubbles of volatile constituents could be formed in the fluid. Stated another way, the constants in the schedule are selected as a function of desired pressure DP to compensate for lag times inherent in the operation of the fluid circuit portion of the hybrid brake module 14.

The particular values selected for the constants will typically be unique to each embodiment of a force generating apparatus according to our invention. The following values are representative of the magnitude of the constants and schedule values in a hybrid brake module 14 of the type depicted in FIGS. 1 and 2, operating over a desired range of chamber pressure form 0 to 2000 pounds per square inch (PSI):

| | |
|---|---|
| DESIRED PRESSURE OPERATING RANGE | 0–2000 PSI |
| KE FMR Hi PRESSURE | 1250 PSI |
| KE FMR Hi PRESS DELTA | −25 PSI |
| KE FMR Medium PRESSURE | 300 PSI |
| KE FMR Medium PRESSURE DELTA | −100 PSI |
| KE FMR DELTA OFFSET | 5 PSI |

Those having skill in the art will recognize that, while we presently consider it preferable to have the components according to our invention arranged as described above, we contemplate many other arrangements within the scope of our invention. We contemplate, for example, that the aspects and elements described above in relation to operation in a fast mode release may be advantageously combined with the gain scheduling, mode selection, and timing functions disclosed in commonly assigned U.S. Patent Applications bearing the assignee's docket numbers DP-305470 and DP-305469 referenced in the background section above, and incorporated herein by reference.

In summary therefore, while the embodiments of our invention disclosed herein are presently considered to be preferred, various changes and modifications can be made without departing from the spirit and scope of the invention. The scope of the invention is indicated in the appended claims, and all changes or modifications within the meaning and range of equivalents are intended to be embraced therein.

We claim:

1. A force generating apparatus for providing a force to a moving element based upon receipt of an electrical force signal, the force generating apparatus comprising:
   a force applying element defining a hydraulic cylinder and including a force applying piston within the cylinder coupled to the moving element for applying force to the moving element in response to increasing or decreasing fluid pressure within the cylinder;
   an actuator defining an apply chamber and further including an actuator piston within the apply chamber, the actuator piston being operatively coupled to an actuator piston drive element for selectively increasing and decreasing a fluid pressure in the apply chamber, the apply chamber being fluidically coupled to the cylinder and force applying piston of the force applying element for actuation thereof by selectively increasing and decreasing chamber pressure of the fluid in the apply chamber and communicating the increased or decreased chamber pressure to the cylinder in response to receiving the electrical force signal; and,
   a controller for determining when the force applying apparatus is in a fast mode release, and modifying the value of the electrical force signal sent to the actuator to limit the rate at which chamber pressure in the apply chamber is reduced during the fast mode release to a predetermined rate low enough to preclude a change in modulus of the fluid during fast mode release.

2. A force generating apparatus according to claim 1 wherein the force applying element comprises a caliper and a rotor.

3. A force generating apparatus according to claim 1 wherein the force applying element comprises a shoe and a drum.

4. A force generating apparatus according to claim 1 wherein the actuator piston drive element of the actuator includes a motor responsive to the electrical force signal and a gear-ball screw assembly operatively coupling the actuator to the motor.

5. A force generating apparatus for providing a force to a moving element based upon receipt of an electrical force signal, the force generating apparatus comprising:
   a force applying element defining a hydraulic cylinder and including a force applying piston within the cylinder coupled to the moving element for applying force to the moving element in response to increasing or decreasing fluid pressure within the cylinder;
   an actuator defining an apply chamber and further including an actuator piston within the apply chamber, the actuator piston being operatively coupled to an actuator piston drive element for selectively increasing and decreasing a fluid pressure in the apply chamber, the apply chamber being fluidically coupled to the cylinder and force applying piston of the force applying element for actuation thereof by selectively increasing and decreasing chamber pressure of the fluid in the apply chamber and communicating the increased or decreased chamber pressure to the cylinder in response to receiving the electrical force signal,
   a solenoid between the apply chamber and the force applying element for selectively isolating the force applying element from the fluid pressure in the apply chamber and connecting the force applying element to receive the fluid pressure in the apply chamber; and
   a controller for determining when the force applying apparatus is in a fast mode release, and modifying the value of the electrical force signal sent to the actuator to limit the rate at which chamber pressure in the apply chamber is reduced during the fast mode release.

6. A force generating apparatus for providing a force to a moving element based upon receipt of an electrical force signal, the force generating apparatus comprising:
   a force applying element defining a hydraulic cylinder and including a force applying piston within the cylinder coupled to the moving element for applying force to the moving element in response to increasing or decreasing fluid pressure within the cylinder;
   an actuator defining an apply chamber and further including an actuator piston within the apply chamber, the actuator piston being operatively coupled to an actuator piston drive element for selectively increasing and decreasing a fluid pressure in the apply chamber, the apply chamber being fluidically coupled to the cylinder and force applying piston of the force applying element for actuation thereof by selectively increasing and decreasing chamber pressure of the fluid in the apply chamber and communicating the increased or decreased chamber pressure to the cylinder in response to receiving the electrical force signal; and,
   a controller for determining when the force applying apparatus is in a fast mode release, and modifying the value of the electrical force signal sent to the actuator to limit the rate at which chamber pressure in the apply chamber is reduced during the fast mode release;

wherein the controller is adapted for receiving a desired force signal and includes means for determining operation in fast mode release by, determining a desired pressure in the hydraulic cylinder from the desired force signal, sensing a chamber pressure in the actuator apply chamber, calculating a chamber pressure error by subtracting the desired pressure from the chamber pressure, and comparing the chamber pressure error to a predetermined value of FMR Delta Pressure indicating fast mode release operation.

7. A force generating apparatus according to claim 6 wherein the controller further includes means for determining the predetermined value of FMR DELTA PRESSURE as a function of desired pressure.

8. A force generating apparatus according to claim 7 wherein the means for determining the predetermined value as a function of desired pressure includes means for defining a first and a second value of FMR DELTA PRESSURE corresponding respectively to a first range and a second range of fast mode release operation as a function of the desired pressure.

9. A force generating apparatus according to claim 6 further comprising a transducer coupled to the chamber of the actuator for sensing the chamber pressure and further coupled to the controller for delivering a chamber pressure signal to the controller.

10. A force generating apparatus according to claim 6 further comprising:
means for enabling FMR when the chamber pressure error is less than an entrance value of FMR DELTA PRESSURE, and for disabling FMR when the chamber pressure error is greater than an exit value of FMR DELTA PRESSURE.

11. A force generating apparatus according to claim 6 further comprising means for modifying the electrical force signal by reducing the value of the electrical force signal during fast mode release.

12. A force generating apparatus according to claim 6 further comprising means for applying the electrical force signal without modification when not operating in fast mode release.

13. A force generating apparatus according to claim 11 including means for storing the modified value of the electrical force signal in the controller.

14. A method for modifying an electrical force signal to an actuator of a force generating apparatus operatively connected to a moving element, the force generating apparatus having a force applying element defining a hydraulic cylinder and including a force applying piston within the cylinder coupled to the moving element for applying the force to the moving element in response to increasing or decreasing fluid pressure within the cylinder, the force generating apparatus also having an actuator defining an apply chamber and further including an actuator piston within the apply chamber coupled to an actuator piston drive element for selectively increasing and decreasing a fluid pressure in the apply chamber, the apply chamber being fluidically coupled to the cylinder and force applying piston of the force applying element for actuation thereof by selectively increasing and decreasing fluid pressure in the apply chamber and cylinder in response to receiving the electrical force signal from a controller, the method including the steps of:
receiving a desired force actuation signal at the controller;
determining when the force generating apparatus is in a fast mode release;
modifying the electrical force signal to limit the rate at which fluid pressure in the apply chamber is reduced during the fast release mode to a predetermined rate low enough to preclude a change in modulus of the fluid during fast mode release; and
sending the modified electrical force signal to the actuator.

15. A method for modifying an electrical force signal to an actuator of a force generating apparatus operatively connected to a moving element, the force generating apparatus having a force applying element defining a hydraulic cylinder and including a force applying piston within the cylinder coupled to the moving element for applying the force to the moving element in response to increasing or decreasing fluid pressure within the cylinder, the force generating apparatus also having an actuator defining an apply chamber and further including an actuator piston within the apply chamber coupled to an actuator piston drive element for selectively increasing and decreasing a fluid pressure in the apply chamber, the apply chamber being fluidically coupled to the cylinder and force applying piston of the force applying element for actuation thereof by selectively increasing and decreasing fluid pressure in the apply chamber and cylinder in response to receiving the electrical force signal from a controller, the method including the steps of:
receiving a desired force actuation signal at the controller;
determining the desired pressure from the desired force actuation signal;
determining an FMR DELTA PRESSURE value from a schedule of FMR DELTA PRESSURE values as a function of desired pressure;
sensing chamber pressure in the actuator apply chamber;
calculating a chamber pressure error by subtracting the desired pressure from the chamber pressure; and comparing the chamber pressure error to the FMR DELTA PRESSURE value for determining if the desired force signal will result in fast mode release operation;
modifying the electrical force signal to limit the rate at which fluid pressure in the apply chamber is reduced during the fast release mode; and
sending the modified electrical force signal to the actuator.

16. A method according to claim 15 wherein the force generating apparatus further includes a transducer coupled to the chamber of the actuator for sensing the chamber pressure and further coupled to the controller for delivering a chamber pressure signal to the controller.

17. A method according to claim 15 further comprising:
enabling FMR when the chamber pressure error is less than an entrance value of FMR DELTA PRESSURE, and disabling FMR when the chamber pressure error is greater than an exit value of FMR DELTA PRESSURE.

18. A method according to claim 14 wherein modifying the electrical force signal comprises reducing the value of the electrical force signal during fast mode release.

19. A method according to claim 14 further comprising applying the electrical force signal without modification when not operating in fast mode release.

20. A method according to claim 14 including storing the modified value of the electrical force signal in the controller.

* * * * *